(12) United States Patent
Goodman et al.

(10) Patent No.: US 9,026,710 B2
(45) Date of Patent: May 5, 2015

(54) CUSTOMIZED SETTINGS FOR DOCKING STATION FOR MOBILE DEVICE

(75) Inventors: Lee N. Goodman, Tyngsboro, MA (US); Elliot G. Eichen, Arlington, MA (US); Rafael Andres Gaviria Velez, Medford, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 576 days.

(21) Appl. No.: 13/306,219

(22) Filed: Nov. 29, 2011

(65) Prior Publication Data
US 2012/0324135 A1 Dec. 20, 2012

Related U.S. Application Data

(63) Continuation-in-part of application No. 13/162,653, filed on Jun. 17, 2011, now Pat. No. 8,538,477.

(51) Int. Cl.
*G06F 13/00* (2006.01)
*H04M 1/725* (2006.01)
*G06F 1/16* (2006.01)
*H04M 1/04* (2006.01)
*H04M 1/2745* (2006.01)

(52) U.S. Cl.
CPC ......... *H04M 1/72563* (2013.01); *G06F 1/1632* (2013.01); *H04M 1/04* (2013.01); *H04M 1/274516* (2013.01); *H04M 1/72572* (2013.01)

(58) Field of Classification Search
USPC .............. 710/301–306, 100; 455/556.1
See application file for complete search history.

(56) References Cited

U.S. PATENT DOCUMENTS

| 7,110,789 | B1 * | 9/2006 | Curtiss et al. ............. 455/556.1 |
| 7,697,963 | B1 | 4/2010 | Pomery |
| 2008/0004038 | A1 | 1/2008 | Dunko |
| 2008/0108386 | A1 | 5/2008 | Hard |
| 2011/0026368 | A1 | 2/2011 | Relyea |
| 2011/0053643 | A1 | 3/2011 | Shmunis |
| 2012/0046074 | A1 | 2/2012 | Gittleman et al. |
| 2012/0054401 | A1 | 3/2012 | Cheng |
| 2012/0155332 | A1 | 6/2012 | Chang et al. |
| 2012/0225622 | A1 | 9/2012 | Kudrna et al. |
| 2012/0265913 | A1 * | 10/2012 | Suumaki et al. ............. 710/303 |
| 2012/0280784 | A1 | 11/2012 | Gaviria Velez et al. |
| 2012/0324135 | A1 | 12/2012 | Goodman et al. |

* cited by examiner

*Primary Examiner* — Glenn A Auve
*Assistant Examiner* — Kim T. Huynh

(57) ABSTRACT

Embodiments disclose a docking station that may include a transmitter to send an identifier associated with the docking station to a mobile device proximate to the docking station, and a receiver to receive settings from the mobile device. The settings may be based on the identifier associated with the docking station, and the settings specify at least one of a ring volume, a ringtone, or a list of contacts. The docking station may also include a processor to interpret the settings so that the docking station performs according to the settings.

19 Claims, 11 Drawing Sheets

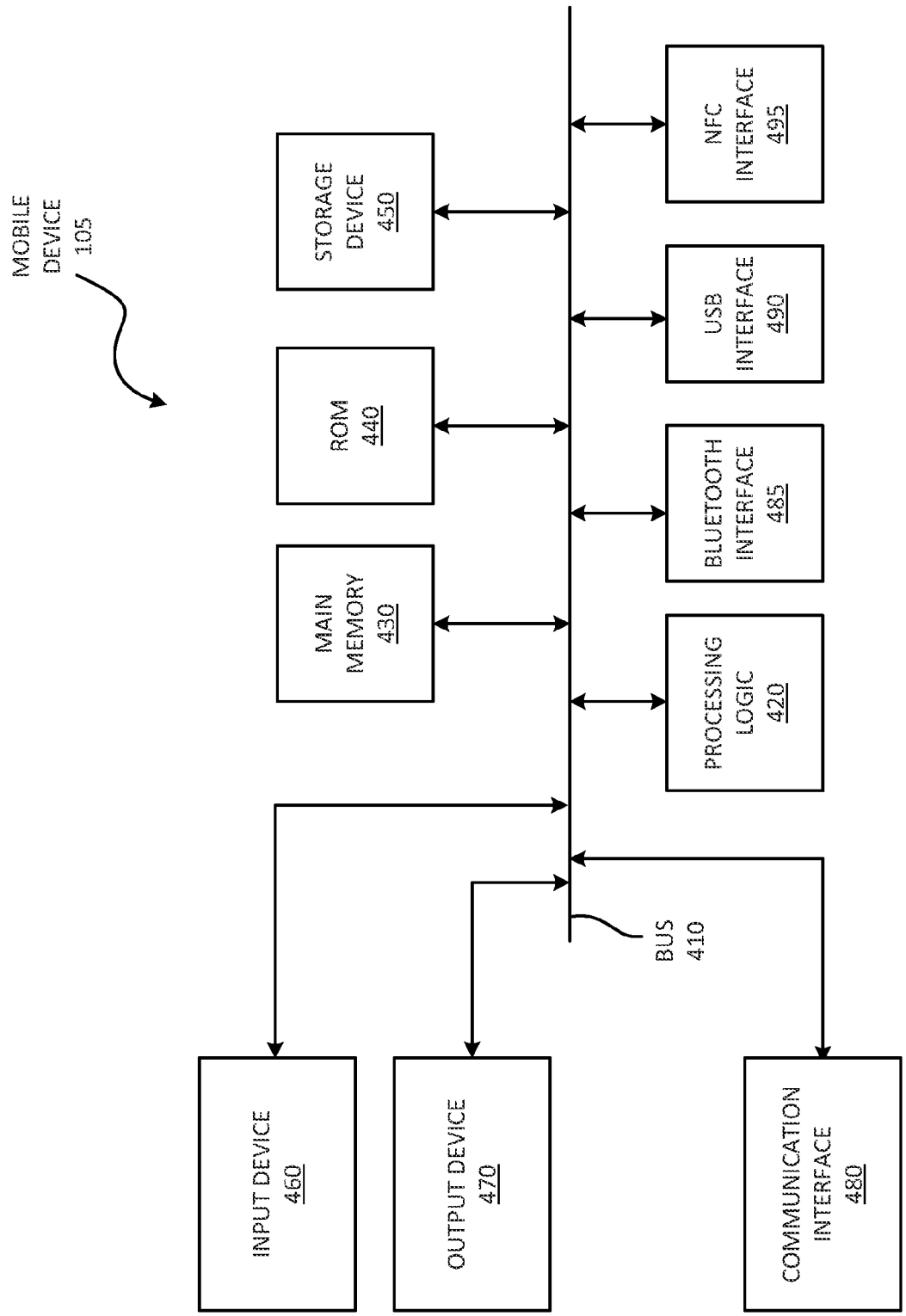

USER PREFERENCE TABLE 502

| | LOCATION 522 | LOCATION TYPE 524 | SETTINGS 526 | PRIORITY 528 |
|---|---|---|---|---|
| 530-1 | CONFERENCE ROOM 8B | | RINGTONE VOLUME=MEDIUM; RINGTONE=DEFAULT; LANGUAGE=ENGLISH; AUTO-ANSWER=ON; AUTO-SPEAKER=ON; CALL VOLUME=HIGH; SPEED DIAL=WORK FAVORITES | 1 |
| 530-2 | | CUBICLE | RINGTONE="WAVES"; RINGTONE VOLUME=LOW; LANGUAGE=ENGLISH; AUTO-ANSWER=OFF; AUTO-SPEAKER=OFF; CALL VOLUME=LOW; SPEED DIAL=WORK FAVORITES | 1 |
| 530-3 | OFFICE 9A | | RINGTONE="HELLO, GOODBYE"; RINGTONE VOLUME = LOW; LANGUAGE=ENGLISH; AUTO-ANSWER=OFF; AUTO-SPEAKER=OFF; CALL VOLUME=MEDIUM; SPEED DIAL=WORK FAVORITES | 1 |
| 530-4 | | OFFICE | RINGTONE VOLUME=MEDIUM; RINGTONE=DEFAULT; LANGUAGE=ENGLISH; AUTO-ANSWER=OFF; AUTO-SPEAKER=OFF; CALL VOLUME=HIGH; SPEED DIAL=WORK FAVORITES | 0 |
| 530-5 | | HOME | RINGTONE="HELLO, GOODBYE"; RINGTONE VOLUME = HIGH; LANGUAGE=SPANISH; AUTO-ANSWER=OFF; AUTO-SPEAKER=OFF; CALL VOLUME=MEDIUM; SPEED DIAL=PERSONAL FAVORITES | 1 |

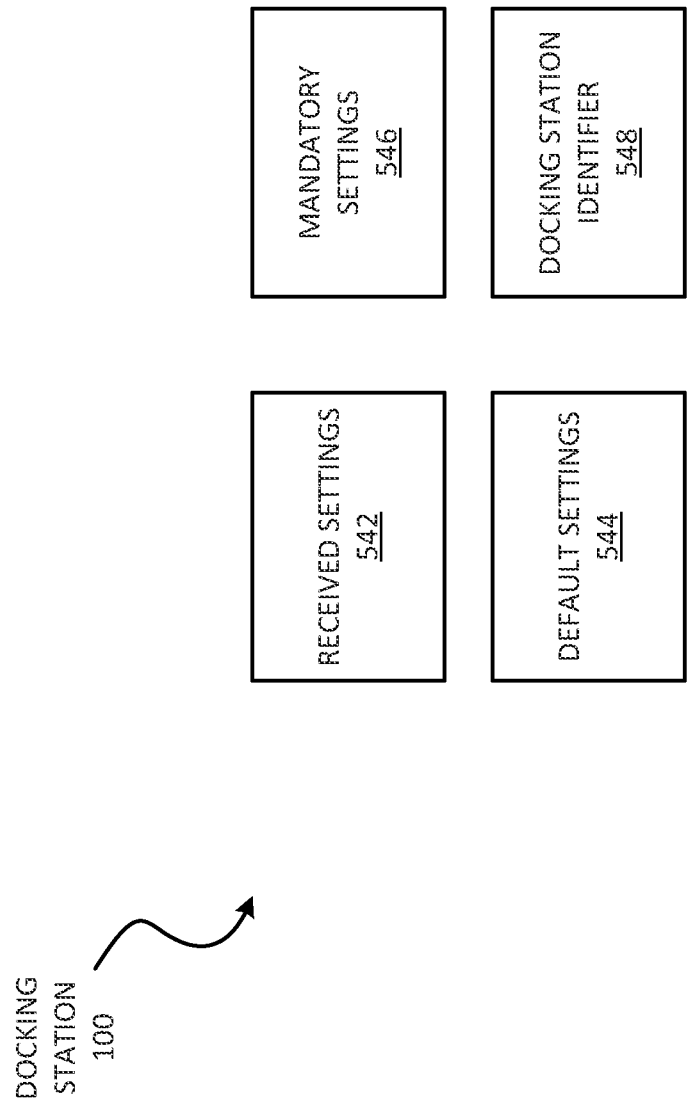

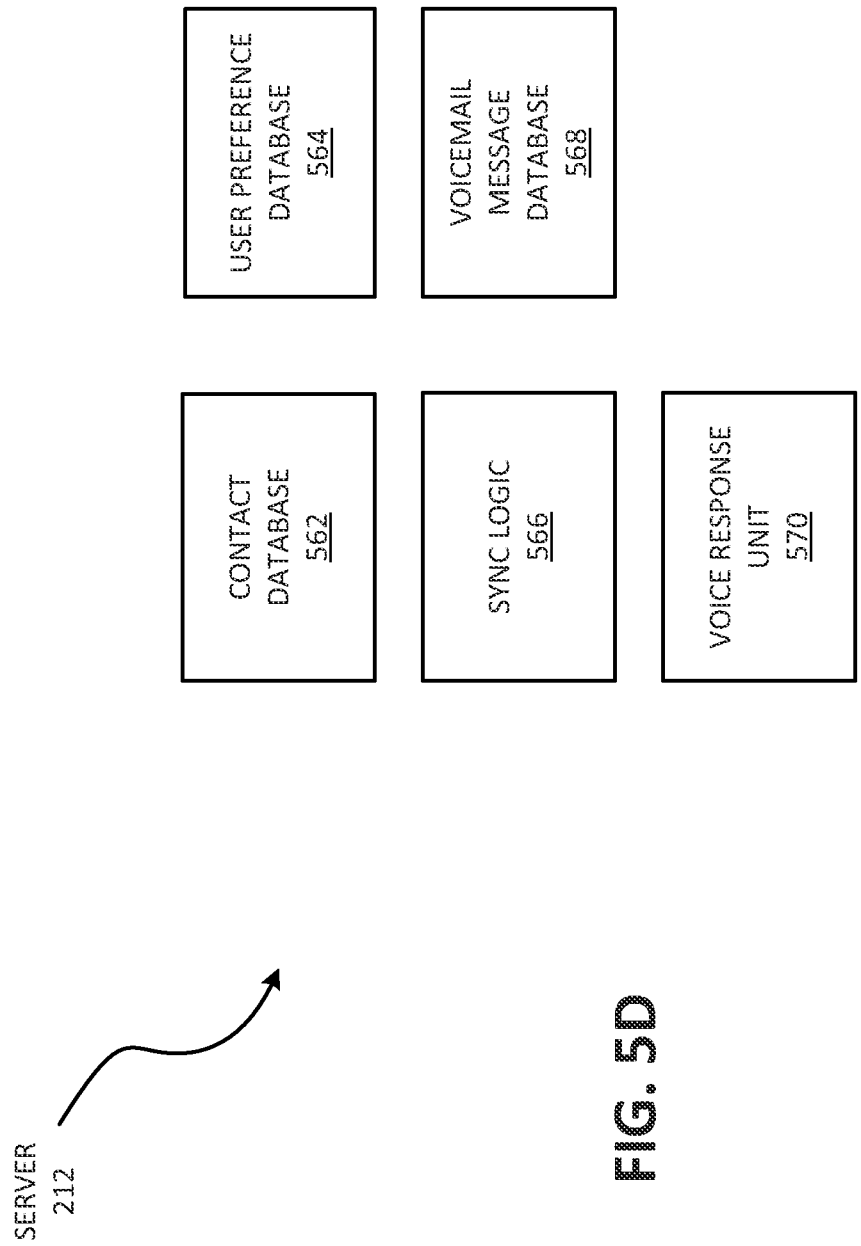

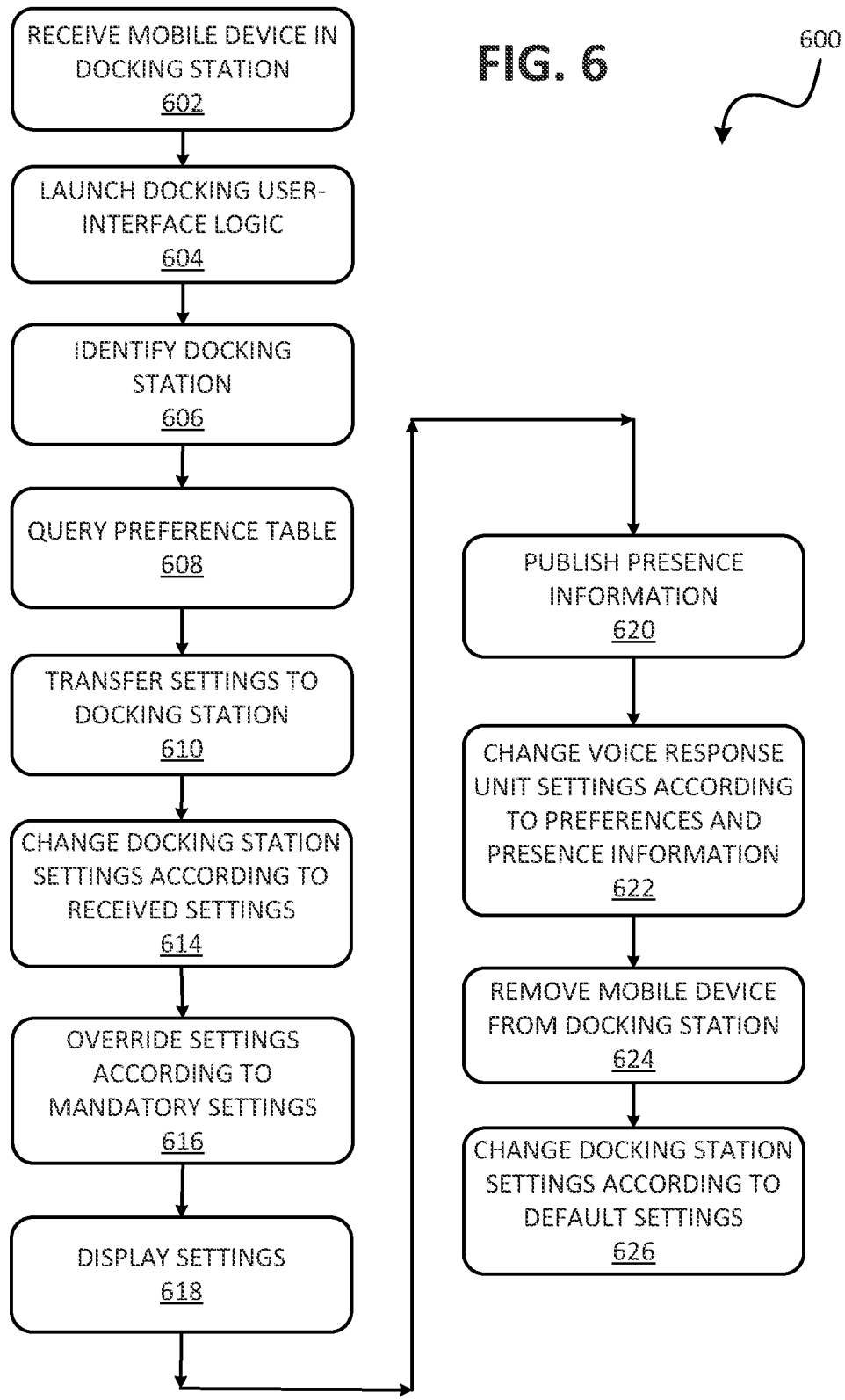

CUSTOMIZED SETTINGS FOR DOCKING STATION FOR MOBILE DEVICE

RELATED APPLICATIONS

This patent application is a continuation-in-part of U.S. patent application Ser. No. 13/162,653, filed Jun. 17, 2011, which is incorporated herein by reference.

BACKGROUND

Mobile devices (e.g., mobile phones) are becoming increasingly powerful and popular. More and more phones sold to consumers are considered "smart phones" or "app phones." These mobile devices can run numerous applications while connecting to global data networks. Further, it is increasingly possible to customize or personalize these mobile devices.

BRIEF DESCRIPTION OF THE DRAWINGS

FIG. 4 is a block diagram of exemplary components of the mobile device of FIGS. 1A and 1B;

FIG. 5B is a diagram of the exemplary user preference table stored in the mobile device of FIGS. 1A and 1B;

FIG. 5C is a block diagram of exemplary functional and logical components of the docking station of FIGS. 1A and 1B;

FIG. 5D is a block diagram of exemplary functional and logical components of the application server of the network of FIG. 2;

FIG. 6 is a flowchart of an exemplary process for customizing the settings of the docking station of FIGS. 1A and 1B according to user preferences.

DETAILED DESCRIPTION OF THE PREFERRED EMBODIMENTS

The following detailed description refers to the accompanying drawings. The same reference numbers in different drawings may identify the same or similar elements. The following detailed description does not limit the invention, as claimed.

As customers become more used to customizing and personalizing their mobile phones, they expect to be able to personalize their desk or non-mobile phones as well. In embodiments described herein, a docking station for a mobile phone may complement the form factor of the mobile phone. In one embodiment, the docking station may include a docking port configured to physically receive the mobile device. The docking station may receive settings (e.g., customized and personalized settings) from the mobile device according to user preferences. Thus, the docking station may behave according to customized or personalized settings. For example, the docking station may employ a custom ring tone saved on the mobile device, etc., when the mobile device is docked in the docking station.

Figure 1A:
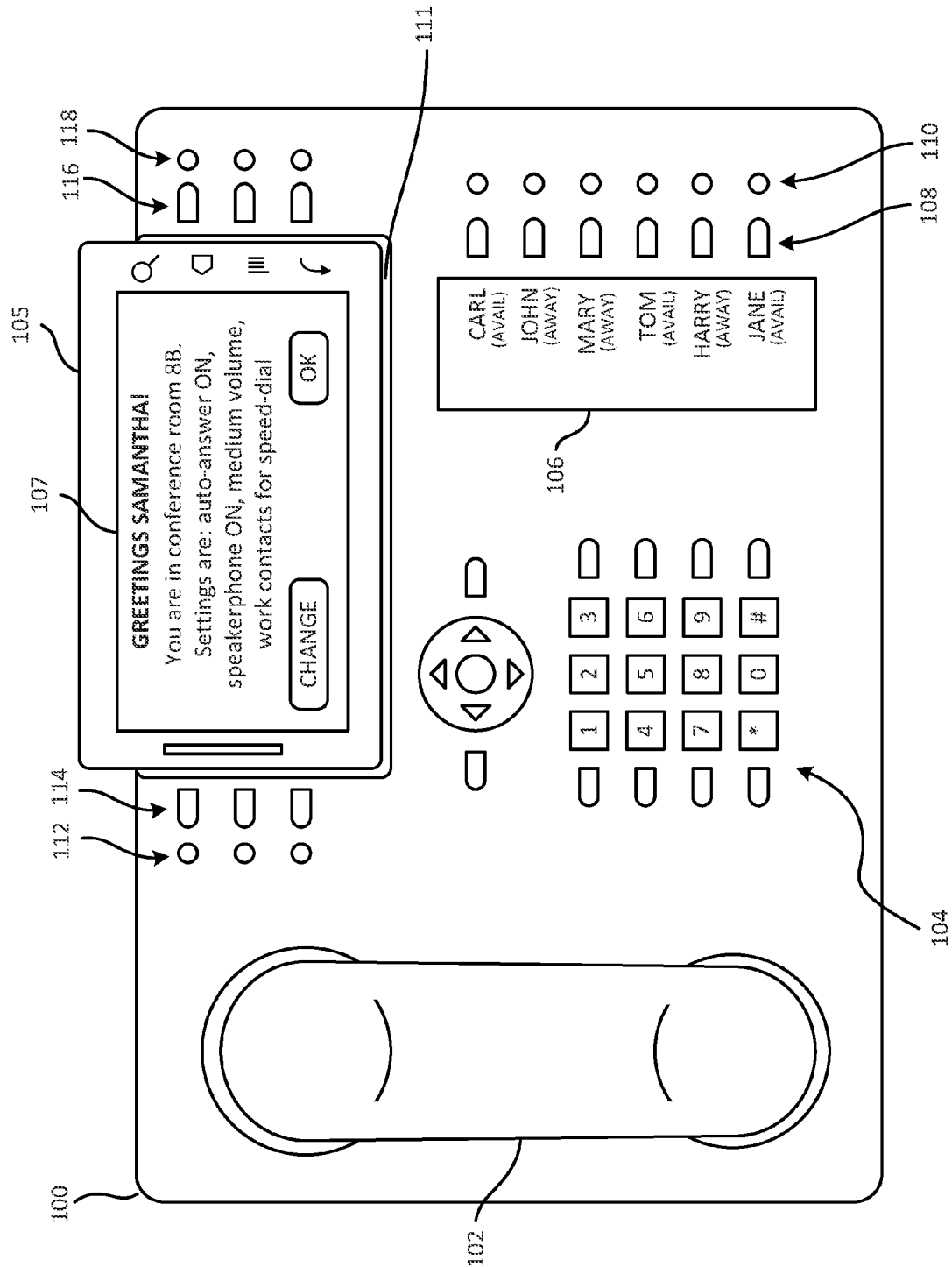
FIG. 1A is a diagram of an exemplary mobile device docked in an exemplary docking station.
Figure 1B:
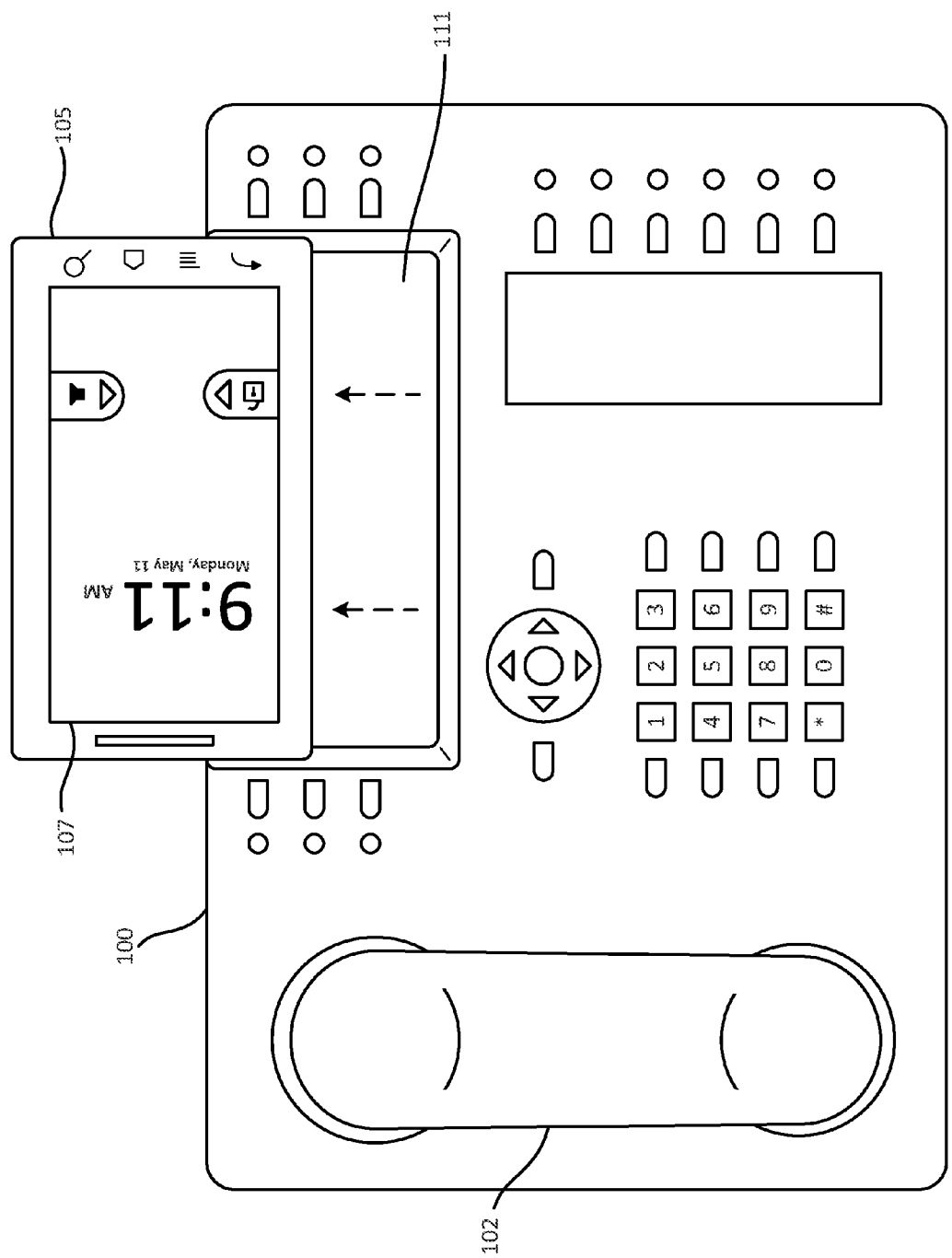
FIG. 1B is a diagram of the exemplary mobile device being undocked from the docking station of FIG. 1A.

For example, FIG. 1A shows a mobile device 105 fully inserted into a docking station 100. As shown in FIG. 1A, mobile device 105 displays a message greeting its user Samantha. As indicated in the greeting message displayed by mobile device 105, mobile device 105 and docking station 100 have configured the settings of docking station 100 to the user's (e.g., Samantha's) preferences. FIG. 1B shows mobile device 105 being removed (in the direction of the arrows with dashed lines) from docking station 100. When mobile device 105 is removed from docking station 100, docking station 100 may return to its default settings (block 626), for example.

Mobile device 105 may include, for example, a cellular telephone (e.g., a smart phone), a hand-held tablet computer, or a larger tablet computer. In one embodiment, mobile device 105 may control the operation of docking station 100 while docked. Further, mobile device 105 may receive user input through docking station 100 and display information on docking station 100. Mobile device 105 may also use a network connection provided by docking station 100 for placing and receiving calls and transmitting and receiving data.

As shown in FIGS. 1A and 1B, docking station 100 may include a handset 102, a keypad 104, a display 106, and a docking port 111. Handset 102 may include a microphone and a speaker (not shown) for a user to carry on a conversation with another party. Handset 102 may be tethered to docking station 100 by a cord (not shown) or wirelessly. Keypad 104 may allow the user to dial a telephone number (e.g., the user may pick up handset 102 and dial a telephone number using keypad 104).

Docking port 111 may receive mobile device 105 for docking (shown fully docked in FIG. 1A). The shape and size of docking port 111 may depend on the external configuration of mobile device 105. Docking port 111 may physically secure mobile device 105 into docking station 100, for example. In one embodiment, mobile device 105 may include a data port (e.g., a Universal Serial Bus (USB) port) to connect with a mating data port in docking station 100 for the exchange of information. Upon being docked with docking station 100, mobile device 105 may exchange data with docking station 100. The exchanged data may include settings based on user preferences, such as ring tone, ring volume, etc. In one embodiment, the preferences include information for populating display 106, such as favorite contacts, recently-called contacts, etc. In another embodiment, mobile device 105 may exchange data with docking station 100 wirelessly (e.g., before being docked), such as via Bluetooth or NFC (Near Field Communications) when mobile device 105 comes into proximity to docking station 100.

A column of programmable buttons 108 and a corresponding column of indicator lights 110 may be situated next to display 106. As shown in FIG. 1A, each of buttons 108 may be situated next to and be associated with information displayed on display 106. For example, one of buttons 108 is next to "CARL" displayed on display 106. In this example, this button may initiate a call to Carl. Each of indicator lights 110 may also be situated next to and be associated with information displayed on display 106. For example, one of indicator lights 110 (next to "CARL" on display 106) may display a color (e.g., green) to indicate information (e.g., that Carl is available to reach by telephone). In one embodiment, the contacts listed on display 106 may depend on the user's preferences (e.g., business contacts versus personal contacts). Further, in one embodiment, the behavior of buttons 108, when pressed, may also depend on the user's preferences (e.g., call the corresponding contact, message the corresponding contact, etc.). Further still, in one embodiment, the color and lighting patterns of indicator lights 110 may be based on user preferences.

As shown in FIG. 1A, another column of programmable buttons 114 and a corresponding column of indicator lights 112 may be situated to one side of docking port 111. Similarly, another column of programmable buttons 116 and a corresponding column of indicator lights 118 may be situated to the other side of docking port 111. Each of buttons 114 and 116 may be situated next to and be associated with information displayed on a display 107 of mobile device 105 once mobile device 105 is docked in docking station 100. For example, one of buttons 116 may be placed next to a menu item (not shown) on display 107. In this example, pressing the button may allow the user to select a function or an application, for example, associated with the menu item. Each of indicator lights 112 and 118 may also be situated next to and be associated with information displayed on display 107. In one embodiment, the menu items displayed on display 107, the behavior associated with buttons 114 and 116, and the color and lighting patterns of indicator lights 112 and 118 may be based on the user's preferences.

Figure 2:
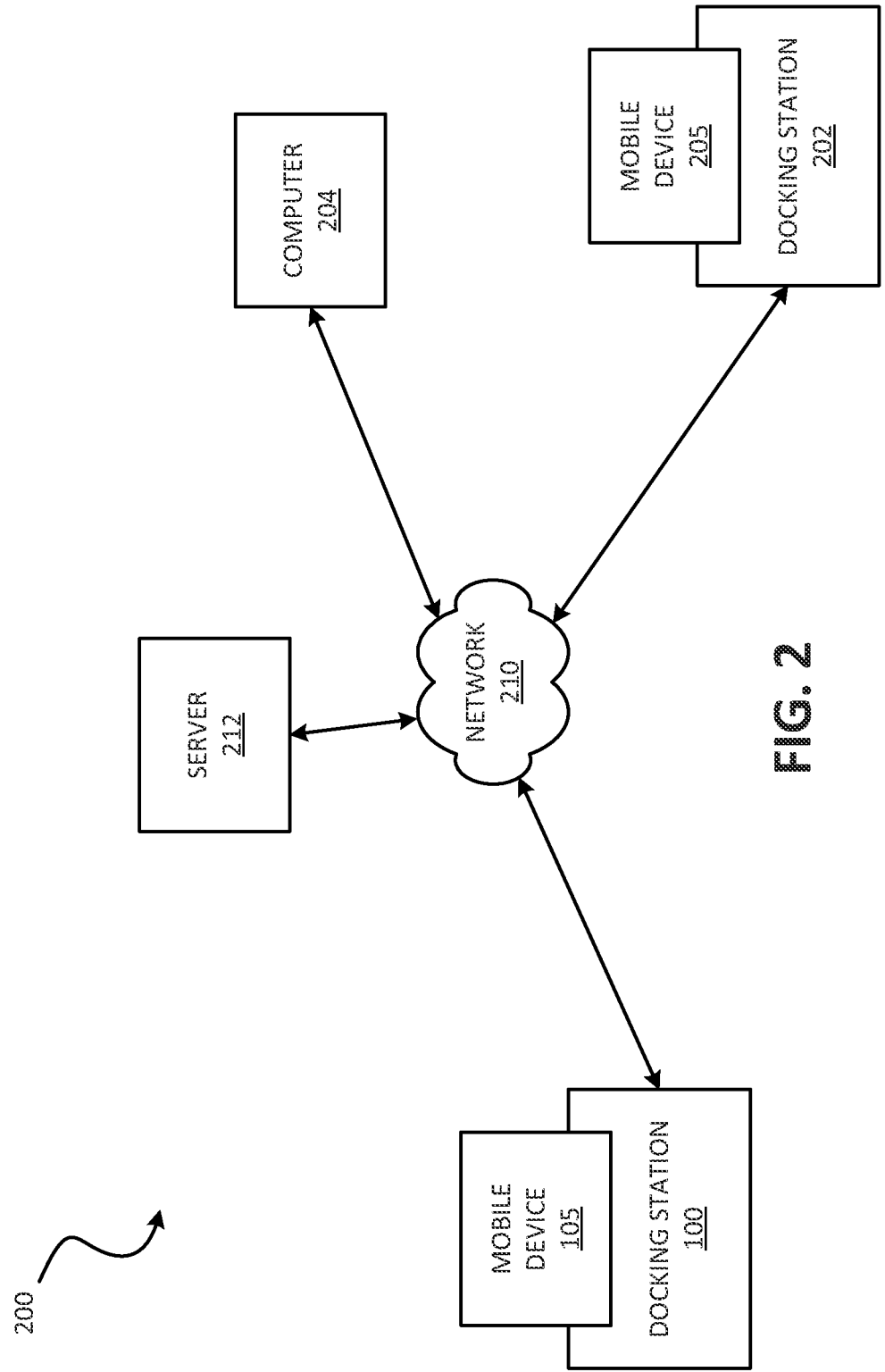
FIG. 2 is a block diagram of an exemplary network including docking stations and mobile devices.

FIG. 2 is a diagram that depicts mobile device 105 docked with docking station 100 in a network 200 in one embodiment. In addition to mobile device 105 and docking station 100, network 200 includes a mobile device 205 and a docking station 202. Network 200 also includes a computer 204, a network 210, and a server 212. Consistent with the example of FIG. 1A, mobile device 105 in FIG. 2 is docked (e.g., physically inserted into docking port 111) with docking station 100. Likewise, mobile device 205 is docked with docking station 202 in network 200. Mobile device 205 and docking station 202 may be configured similarly to mobile device 105 and docking station 100 described above.

As shown in FIG. 2, docking station 100 may connect to network 210 for sending and/or receiving data to/from other devices in network 200, such as server 212. Docking station 100 may also connect to network 210 for placing and receiving telephone calls to other devices, such as mobile device 205 and/or docking station 202. Network 210 may include one or more networks that implement the Internet Protocol (IP), Ethernet, or other protocols. Network 210 may include one or more networks of various types, including a wireless public land mobile network (PLMN) (e.g., a Code Division Multiple Access (CDMA) 2000 PLMN, a Global System for Mobile Communications (GSM) PLMN, a Long Term Evolution (LTE) PLMN and/or other types of PLMNs). Network 210 may include a telecommunication network (e.g., a Public Switched Telephone Network (PSTN)), a local area network (LAN), a wide area network (WAN), a metropolitan area network (MAN), an intranet, the Internet, or a cable network (e.g., an optical cable network).

Server 212 may store information associated with many different mobile devices, such as mobile devices 105 and 205. For example, server 212 may store user preferences associated with users of mobile devices. As another example, server 212 may store contact information (e.g., address/telephone book information) for users of these mobile devices. Contact information may include the name, mobile telephone number, home telephone number, email addresses, etc., for each contact. The user of mobile device 105 may have a user account with server 212. The contact information may be synchronized between server 212 and a mobile device (e.g., mobile device 105). That is, adding preferences or a contact in mobile device 105 may automatically add the preferences or contact to the user's account in server 212, and vice versa.

Server 212 may also receive, store, and transmit information about the presence or status of users. For example, server 212 may allow a user to publish his status information (at home, at work, etc.). In this respect, server 212 may implement the Extensible Messaging and Presence Protocol (XMPP). Alternatively, server 212 may also implement the Session Initiation Protocol (SIP) for Instant Messaging and Presence Leveraging Extensions (SIMPLE) for publishing and subscribing to presence information. In one embodiment, server 212 may apply settings based on the user's presence information. For example, if a user's presence information indicates that the user is at work, server 212 may use English (the user's preferred language at work) when interacting with the user of mobile device 105. On the other hand, if the user's presence information indicates that the user is at home, server 212 may use Spanish (the user's preferred language at home) when interacting with the user of mobile device 105.

The user may interact with information stored in server 212 through, for example, mobile device 105 or computer 204. That is, the user may sit at computer 204 to edit user preferences and/or contacts stored in server 212. In one embodiment, server 212 interacts with the user of computer 204 according to settings as specified by the user's preferences (e.g., a language). As mentioned above, if computer 204 is used to update or add new preference or contact information in server 212, this updated or new information may be synched to other devices, such as mobile device 105.

Server 212 may provide any number of other application services to the user of mobile device 105. For example, in one embodiment, the user of mobile device 105 may call server 212 to receive voicemail messages or leave voicemail messages for other users.

The devices in network 200 are exemplary. Network 200 may include more, fewer, or a different arrangement of devices than shown in FIG. 2. Further, each device in network 200 may be able to communicate with every other device in network 200.

Figure 3:
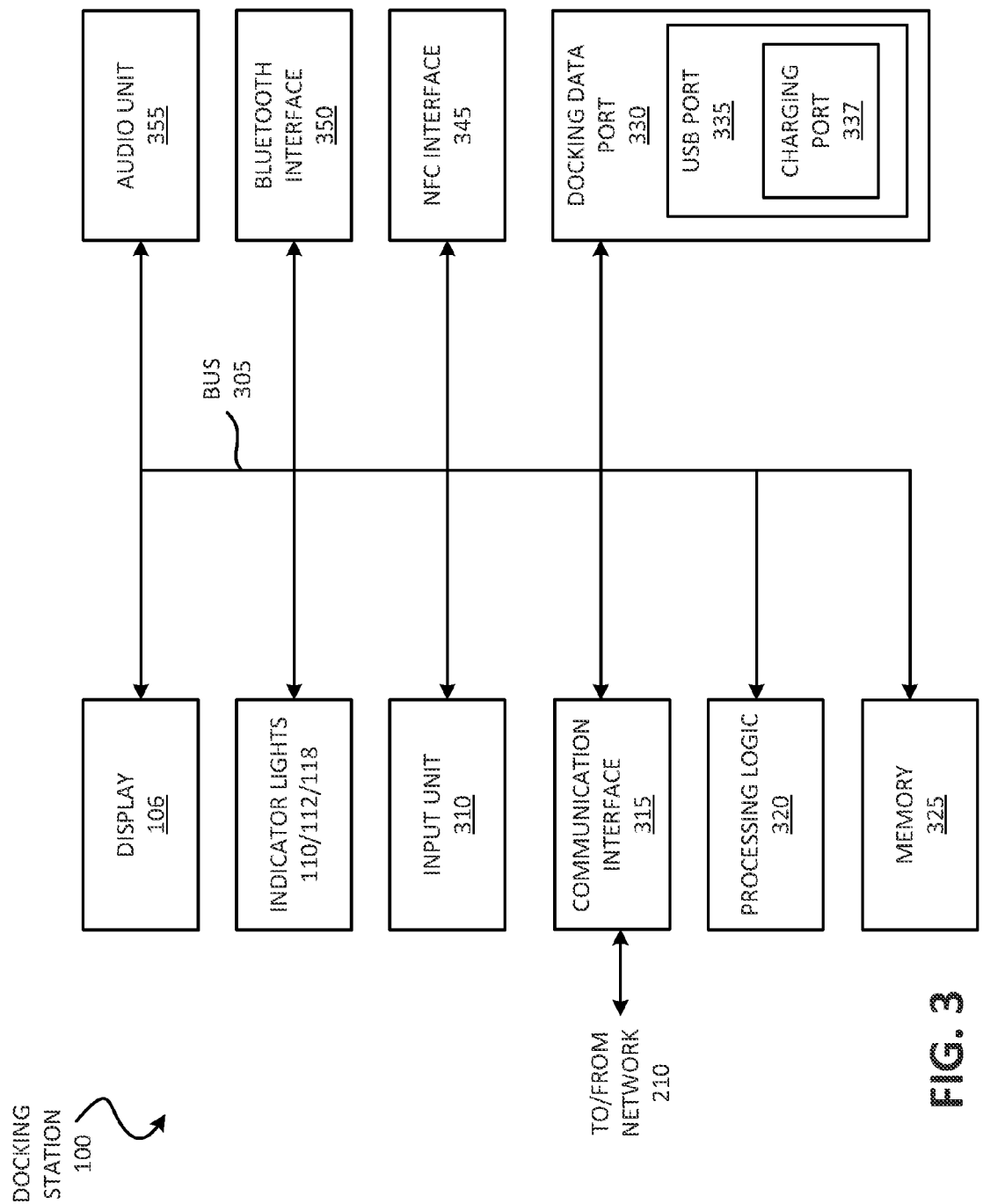
FIG. 3 is a block diagram of exemplary components of the docking station of FIGS. 1A and 1B.

FIG. 3 is a block diagram of exemplary components of docking station 100. Docking station 100 may include display 106, indicator lights 110, 112, and 118, a bus 305, an input unit 310, a communication interface 315, a processing logic 320, a memory 325, a docking data port 330, a USB port 335, a charging port 337, a Near Field Communication (NFC) interface 345, a Bluetooth interface 350, and an audio unit 355.

Bus 305 may include a path that permits communication among the components of docking station 100. As indicated above, display 106 displays data, video, or other types of data. Display 106 may include a liquid crystal display (LCD). In one embodiment, display 106 may include a touch-screen display (e.g., capacitive or resistive) that registers touch input at different locations upon the screen.

As also indicated above, indicator lights 110, 112, and 118 may illuminate to convey information to the user. In one embodiment, indicator lights 110, 112, and 118 may each include one, two, three or more light-emitting diodes (LEDs) so that any color may be displayed. Indicator lights 110, 112, and 118 may blink at different duty cycles to convey information to the user.

Input unit 310 may include an alphanumeric keypad for receiving indications from a keypad, buttons, and/or a touch-screen display associated with docking station 100. Communication interface 315 may include a transceiver (e.g., a transmitter and/or a receiver) for communicating with network 210. In one embodiment, communication interface 315 includes a network interface card (NIC), such as an Ethernet card.

Processing logic 320 may include a processor, microprocessor, or processing logic that may interpret and execute instructions. The instructions may be stored in memory 325. Memory 325 may include a random access memory (RAM), a Read Only Memory (ROM), or another type of dynamic or static storage device that may store information and instructions for execution by processing logic 320.

Docking data port 330 may include a port that physically engages mobile device 105 for exchanging data. Port 330 may include a USB port 335, for example. Though a single USB port 335 is depicted in FIG. 3, docking station 100 may include multiple USB ports (not shown) or a USB hub. In another embodiment, port 330 may include a wireless interface for exchanging data between mobile device 105 and docking station 100.

Charging port 337 may enable the battery of mobile device 105 to be charged while mobile device 105 is docked in the docking station 100. Charging port 337 may include an electrical connection for supplying electrical current to a battery of mobile device 105. In one embodiment, USB port 335 includes charging port 337 (e.g., USB port 335 may act as both a data port and a charging port).

NFC interface 345 may include a system that enables the short range (e.g., 10 cm) exchange of data with mobile device 105. When mobile device 105 is close to docking station 100 (e.g., mobile device 105 is inserted into docking port 111), NFC interface 345 may receive information (e.g., read phone identity information) from a corresponding NFC interface located in mobile device 105. In addition to phone identity information, NFC interface 345 may also receive or read customized user settings or preferences associated with mobile device 105 from the corresponding NFC interface located in mobile device 105. Likewise, Bluetooth interface 350 may include a system for connecting to and exchanging data with other Bluetooth enabled devices.

Audio unit 355 may include a microphone (e.g., in handset 102 or the body of docking station 100) for receiving audio into docking station 100. In one embodiment, audio unit 355 passes the received audio to mobile device 105. Audio unit 355 may also include a speaker (e.g., in handset 102 or in the body of docking station 100) for playing audio data. In one embodiment, audio unit 355 may play audio received from mobile device 105.

The configuration of components of docking station 100 depicted in FIG. 3 is for illustration. Docking station 100 may include additional, fewer and/or different components than those depicted in FIG. 3. Docking station 100 may include a magnetic sensor that may detect the insertion of mobile device 105 into docking port 330 and may thereby initiate various functions at docking station 100 or at mobile device 105 (e.g., initiate execution of an application in mobile device 105 and/or docking station 100, etc.).

FIG. 4 is a block diagram of exemplary components of mobile device 105. Mobile device 105 may include a bus 410, a processing logic 420, a main memory 430, a ROM 440, a storage device 450, an input device 460, an output device 470, a communication interface 480, a Bluetooth interface 485, a USB interface 490, and a NFC interface 495. Bus 410 may include a path that permits communication among the components of mobile device 105.

Processing logic 420 may include a processor, microprocessor, or processing logic that may interpret and execute instructions. Main memory 430 may include a RAM or another type of dynamic storage device that stores information and instructions for execution by processing logic 420. ROM 440 may include a ROM device or another type of static storage device that stores information and instructions for use by processing logic 420. Storage device 450 may include a magnetic, optical, or solid-state medium for recording and storing information. In one embodiment, processing logic 420 executes instructions of an operating system and/or applications stored in main memory 430, ROM 440, and/or storage device 450. The operating system may include Android, iOS, MeeGo, Windows Phone, etc.

Input device 460 permits the user of mobile device 105 to input information to mobile device 105. Input device 460 may include, for example, a keypad, a keyboard, a touch-sensitive display, voice recognition logic, biometric sensors, etc. Output device 470 outputs information to the operator and may include a display, a speaker, etc.

Communication interface 480 may include a transceiver (e.g., a transmitter and/or a receiver) that enables mobile device 105 to communicate with other devices and/or systems. For example, communication interface 480 may include a radio-frequency transceiver for communicating via a PLMN of network 210.

Bluetooth interface 485 may permit mobile device 105 to wirelessly communicate with docking station 100 (e.g., via Bluetooth interface 350) using the Bluetooth standard. Likewise, USB interface 490 may permit mobile device 105 to physically and electrically connect with USB port 335 of docking station 100 using the USB standard. Further, NFC interface 495 includes a system that enables the exchange of data with NFC interface 345 in docking station 100.

Figure 5A:
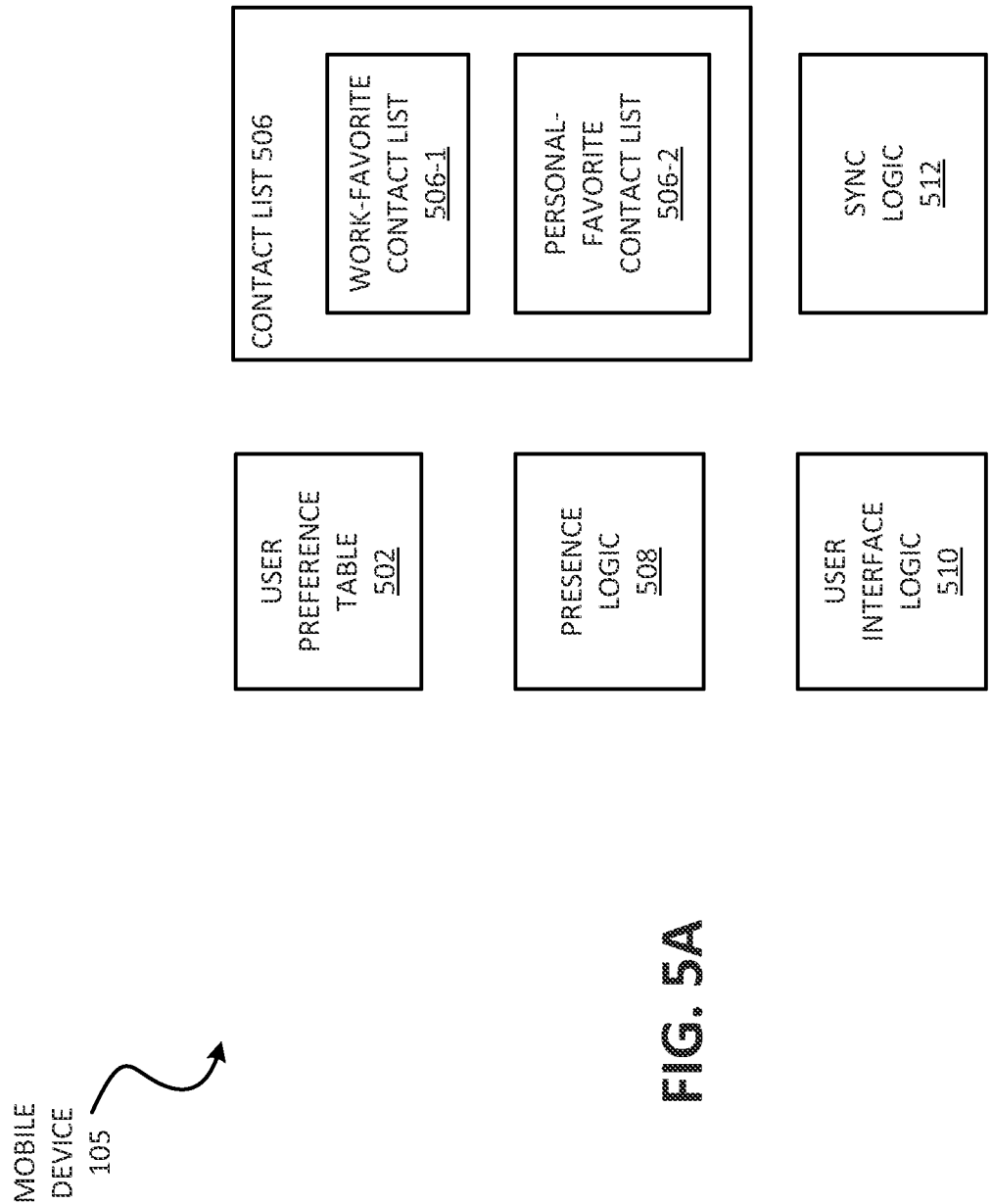
FIG. 5A is a block diagram of exemplary functional and logical components of the mobile device of FIGS. 1A and 1B.

As discussed above, mobile device 105 may store personal preferences that control the settings of docking station 100 when mobile device 105 is docked in docking station 100. FIG. 5A is a block diagram of exemplary functional and logical components of mobile device 105 (e.g., data or functional components stored in main memory 430, ROM 440, and/or storage device 450). Mobile device 105 may include user preference table 502, contact list 506, presence logic 508, user interface logic 510, and sync logic 512. As shown, contact list 506 may include a work-favorite contact list 506-1 and a personal-favorite contact list 506-2.

User preference table 502 may store the user's preferences for when mobile device 105 is docked in docking stations, such as docking station 100. For example, the user's preferences may specify the speaker volume (e.g., in handset 102 or a speaker), ringtone, language, icons, color of indicator lights 118, actions associated with buttons 108, 114, and 116, etc. Preferences may also specify default actions upon certain events (e.g., upon receipt of a phone call). For example, a default action may specify automatically answering incoming calls. Preferences may be based on characteristics of docking station 100, such as the location in which docking station 100 is located (e.g., work, home, conference room, bedroom, etc.), the ambient light in the room, etc.

FIG. 5B is a block diagram of exemplary preferences table 502. Preference table 502 specifies rules for selecting customized or personalized settings for docking station 100. Preferences table 502 includes a location field 522, a location type field 524, a settings field 526, and a priority field 528. Fields 522 through 524 specify criteria of a rule that, when met, invoke the settings stored in settings field 526. Should two different groups of settings apply, then the settings associated with the highest priority field specified in priority field 528 apply.

Location field 522 specifies a location of the docking station. For example, as specified in rule 530-1, when mobile device 105 is docked to a docking station in conference room 8B, the settings in settings field 526 of rule 530-1 may apply.

As specified in rule 530-3, when mobile device 105 is docked to a docking station in Office 9A, the settings in settings field 526 of rule 530-3 may apply.

Location type field 524 specifies a type of location for the docking station. For example, as specified in rule 530-2, when mobile device 105 is docked to a docking station in a cubicle, then the settings in settings field 526 of rule 530-2 apply. As specified in rule 530-4, when mobile device 105 is docked to a docking station in an office (as opposed to a cubicle), then the settings in settings field 526 of rule 530-4 apply. As specified in rule 530-5, when mobile device 105 is docked to a docking station at home (as opposed to a work conference room), then the settings in settings field 526 of rule 530-5 apply.

Settings field 526 specifies the settings for the docking station when the criteria specified in other fields (e.g., location field 522 and/or location type field 524) are met. For example, as specified in rule 530-1, settings field 526 specifies settings appropriate for conference room 8B. These settings specify a medium ringtone volume (RINGTONE VOLUME=MEDIUM), the default ringtone (RINGTONE=DEFAULT), English as the language (LANGUAGE=ENGLISH), automatic answer for incoming calls (AUTO-ANSWER=ON), speakerphone on by default (AUTO-SPEAKER=ON), and a high in-call volume (CALL VOLUME=HIGH). The settings further specify that the speed dial list should include the user's work contacts.

In contrast to rule 530-1, settings field 526 in rule 530-5 specifies settings appropriate for home. These settings specify the song "Hello, Goodbye" for the ringtone (RINGTONE="HELLO, GOODBYE") at a high ringtone volume (RINGTONE VOLUME=HIGH). The settings also specify the Spanish language, which may be what the user speaks at home (versus using English at work). The settings also turn off the automatic answer feature (AUTO-ANSWER=OFF) and the automatic speaker feature (AUTO-SPEAKER=OFF).

Any number of settings may be specified in settings field 526. In one embodiment, settings field 526 may specify settings information related to indicator lights (e.g., colors or patterns for indicator lights 112, 118, or 110). Different colors may indicate different presence information associated with the corresponding contact. For example, green may indicate that the corresponding contact is available for a telephone call, and red may indicate that the corresponding contact is not available for a telephone call. In one embodiment, settings field 526 may specify different lighting patterns (e.g., flashing at different rates, solid, not flashing, etc.) for indicator lights 110, 112, and/or 118. For example, settings field 526 may specify that a flashing green indicator light indicates that a contact has just become available for a telephone call (e.g., has been available for less than a threshold period of time); settings field 526 may specify that a flashing red indicator light indicates that a contact just became unavailable for a telephone call (e.g., has not been available for less than a threshold period of time); settings field 526 may specify that a solid green indicator light 110 indicates that the contact has been available for a call for some time (e.g., greater than a threshold); and settings field 526 may specify that a solid red indicator light 110 indicates that the contact has been unavailable for some time (e.g., greater than a threshold). The thresholds in this example may be 1, 2, 3, 4, 5, 10, 15, and/or 20 minutes for example.

Priority field 528 specifies which settings take precedence if the conditions for multiple settings fields are satisfied. For example, if mobile device 105 is in Office 9A, both rule 530-3 and rule 530-4 may apply. However, because the priority for rule 530-3 is higher than the priority for rule 530-4, then rule 530-3 applies (the rule specific to Office 9A).

User preference table 502 may include more, fewer, or a different arrangement of fields than shown in FIG. 5B. For example, preference table 502 may include a time field that specifies a period of time during which the corresponding rule applies. In another embodiment, location field 522 and location type field 524 may be combined into a single field. Preference table 502 may include an ambient light field specifying the ambient light level surrounding docking station 100. If the ambient light level is low, the ring volume may be low as well. If the ambient light level is high, the ring volume may be high as well. Preference table 502 may include an ambient sound field specifying the ambient sound level surrounding docking station 100. If the ambient sound is high, the ring volume may be high. If the ambient sound is low, the ring volume may be low, for example.

Returning to FIG. 5A, contact list 506 includes information related to contacts associated with the user of mobile device 105. For example, a contact may include a name, a nickname, a home telephone number, a mobile telephone number, a postal address, an email address, an instant messaging address, etc. Work-favorite contact list 506-1 may store the contact information for contacts that the user of mobile device 105 specifies as contacts from work or the most frequently contacted contacts when the user is at work. Personal-favorite contact list 506-2 may store the contact information for contacts that the user of mobile device 105 specifies as personal contacts or the most frequently contacted personal contacts. Other types of lists of contacts may also be stored in contact list 506, such as a speed-dial list, a recently-contacted list, etc.

Presence logic 508 may determine the presence information associated with the user of mobile device 105. For example, once docked into docking station 100, presence logic 508 may determine the user's presence information as "In Conference Room 8A." When presence logic 508 detects that mobile device 105 is connected to the user's home docking station, presence logic 508 may determine that the presence information is "At Home." Presence logic 508 may use rules that consider different aspects of the environment of mobile device 105 to determine a presence state. For example, mobile device 105 may use the time of day, the presence of local wireless networks, etc. Once presence information is determined, presence logic 502 may publish the information to server 212.

User-interface logic 510 (e.g., an application in mobile device 105) may launch when mobile device 105 is docked with docking station 100. In this instance, user-interface logic 510 may provide docking station 100 with settings based on the user preferences stored in preference table 502. User-interface logic 510 may instruct docking station 100 to behave according to settings sent to docking station 100. User-interface logic 510 may also instruct docking station 100 to display information on display 106. User-interface logic 510 may instruct indicator lights (e.g., indicator lights 110, 112, and/or 118) to show a color, for example. In one embodiment, colors may be specified by user preferences (e.g., the color used to indicate that a contact is available). User-interface logic 510 may also receive information from docking station 100, such as information indicating a button press by a user. User-interface logic 510 may also associate information received from docking station 100 (e.g., a button press) with an action (e.g., call the contact displayed adjacent the corresponding button). In one embodiment, user-interface logic 510 may run in mobile device 105 continuously and may recognize when mobile device 105 is docked to or undocked from docking station 100.

Sync logic 512 may synchronize information stored in mobile device 105 (e.g., preference table 502 and/or contact list 506) with information stored in server 212. For example, sync logic 512 may transmit user preferences (e.g., preference table 502) to server 212 and/or may receive preferences from server 212 for storing in preference table 502. Sync logic 512 may transmit contact information (e.g., stored in contact list 506) to server 212 and/or may receive contact information from server 212 for storing in contact list 506.

The configuration of components of mobile device 105 depicted in FIGS. 4 and 5A are for illustrative purposes. Other configurations may be implemented. That is, mobile device 105 may include additional, fewer and/or different components than those depicted in FIGS. 4 and 5A. Further, other devices in network 200 may include the components and perform the functions described above with respect to mobile device 105 in FIGS. 4 and 5A.

FIG. 5C is a block diagram of exemplary functional or logical components of docking station 100 (e.g., stored in memory of docking station 100). Docking station 100 may include received settings 542, default settings 544, mandatory settings 546, and a docking station identifier 548. The configuration of components of docking station 100 depicted in FIG. 5C is for illustrative purposes. Docking station 100 may include additional, fewer and/or different components than those depicted in FIG. 5C.

Received settings 542 include settings received from mobile device 105 (e.g., once mobile device 105 is docked into docking station 100). Received settings 542 may indicate the ringtone, the ringtone volume, the speaker volume (e.g., in handset 102 or a speaker), language, icons, color of indicator lights, actions associated with buttons 108, 114, and 116, etc. Received settings 542 may also include default actions upon certain events (e.g., upon receipt of a phone call). For example, one action may include automatically answering an incoming call.

Default settings 544 include settings for when mobile device 105 is not docked to docking station 100 or when mobile device 105 does not indicate a particular setting (e.g., for when received settings 542 does not specify ring tone). As with received settings 542, default settings 544 may store settings for the speaker volume (e.g., in handset 102 or a speaker), ringtone, language, icons, color of indicator lights 110, 112, and 118, actions associated with buttons 108, 114, and 116, etc. Default settings 544 may also include default actions upon certain events (e.g., upon receipt of a phone call). Default settings 544 may be based on characteristics of docking station 100, such as the location of docking station 100 (e.g., work, home, conference room, bedroom, etc.), the time, the ambient sound level in the room, the ambient light in the room, etc.

Mandatory settings 546 include settings that override received settings 542 that are received from mobile device 105. That is, when there is a conflict between mandatory settings 546 and received settings 542, mandatory settings 546 prevail. As with received settings 542 and default settings 544, mandatory settings 546 may store the maximum speaker volume (e.g., in handset 102 or a speaker), ringtone, language, icons, color of indicator lights 110, 112, and 118, the actions associated with buttons 108, 114, and 116, etc. Mandatory settings 546 may also include default actions upon certain events (e.g., upon receipt of a phone call). Mandatory settings 546 may be based on characteristics of docking station 100, such as the location in which docking station 100 is located (e.g., work, home, conference room, bedroom, etc.), the ambient light in the room, etc.

Docking station identifier (ID) 548 may store information identifying or describing the docking station, such as docking station 100. In one implementation, docking station ID 548 may simply store a serial number of the docking station. In one implementation, docking station ID 548 may include the Media Access Control (MAC) address of the docking station. Mobile device 105 may then use the serial number or MAC address to query a database to determine the location of the docking station, for example. In another embodiment, docking station ID 548 may store a description of the environment in which the docking station is found. For example, docking station ID 548 may store "conference room 8B," "home bedroom," "office," "cubicle," etc. User interface logic 510 may use docking station ID 548 in combination with preference table 502 to determine the settings to send to docking station 100, for example.

As discussed above, server 212 may store information on behalf of mobile devices, such as mobile device 105. FIG. 5D is a block diagram of exemplary functional or logical components of server 212 (e.g., stored in a memory of server 212). Server 212 may include information for many different users, mobile devices, and/or docking stations. Server 212 may include contacts database 562, user preference database 564, sync logic 566, voicemail message database 568, and voice response unit 570. The information in server 212 may act as a backup to information stored in mobile device 105 (e.g., contact list 506 and preference table 502). Users may edit information stored in contact database 562 using, for example, computer 204, mobile device 105, or another device. The edited information may be reflected in mobile device 105 (e.g., contact list 506 or preference table 502) when mobile device 105 syncs with server 212.

Contact database 562 may store substantially the same information as contact list 506 (e.g., contact information associated with a user). Contact database 562, however, may store contact information for many different users of different mobile devices (e.g., mobile device 105 and mobile device 205). Contact database 562 may act as a backup to contact list 506.

User preference database 564 may store substantially the same information as user preference table 502. User preference database 564, however, may store preference information for many different users of different mobile devices (e.g., mobile device 105 and mobile device 205). User preference database 564 may act as a backup to user preference table 502.

Sync logic 566 may synchronize stored information between mobile devices (such as mobile device 105 and 205) and server 212. Synchronized information may include preference table 502 and contact list 506 (e.g., synched to user preference database 564 and contacts database 562).

Voicemail message database 568 may include voicemail messages left for many different users. Voice response unit 570 may allow a user to call server 212, interact with server 212 (e.g., by using a keypad in response to voice instructions) to receive voicemail messages, for example.

The configuration of components of server 212 depicted in FIG. 5D is for illustrative purposes. Other configurations may be implemented. That is, server 212 may include additional, fewer and/or different components than those depicted in FIG. 5D.

As described above, the settings of docking station 100 may depend on preference information stored in mobile device 105. FIG. 6 is a flowchart of an exemplary process 600 for allowing a mobile device to control the settings (e.g., according to user preferences) of docking station 100. Process 600 is described with respect to FIG. 7, which illustrates messages and information passed between mobile device 105, docking station 100, and server 212. The description of process 600 below assumes that a user named "Samantha" is associated with mobile device 105; docking station 100 is in conference room 8B and identifies itself as such; and mobile device 105 includes preference table 502 as shown in FIG. 5B.

Process 600 begins when the user inserts mobile device 105 into docking station 100 (block 602). As shown in FIG. 1A, Samantha has moved mobile device 105 into docking port 111 of docking station 100 so that mobile device 105 is situated in docking station 100. In one embodiment, docking mobile device 105 also electrically connects mobile device 105 to docking station 100 via USB port 335 (in docking station 100) with USB interface 490 (in mobile device 105). In one embodiment, docking station 100 may detect mobile device 105 as a result of the USB connection or with near-field communications, Bluetooth, etc. Mobile device 105 may communicate with docking station 100 via USB, Bluetooth, or NFC. Mobile device 105 may be said to be docked with docking station 100 when there is a physical connection between the two or when mobile device 105 is proximate to docking station 100 as determined by NFC or Bluetooth, for example.

Figure 7:
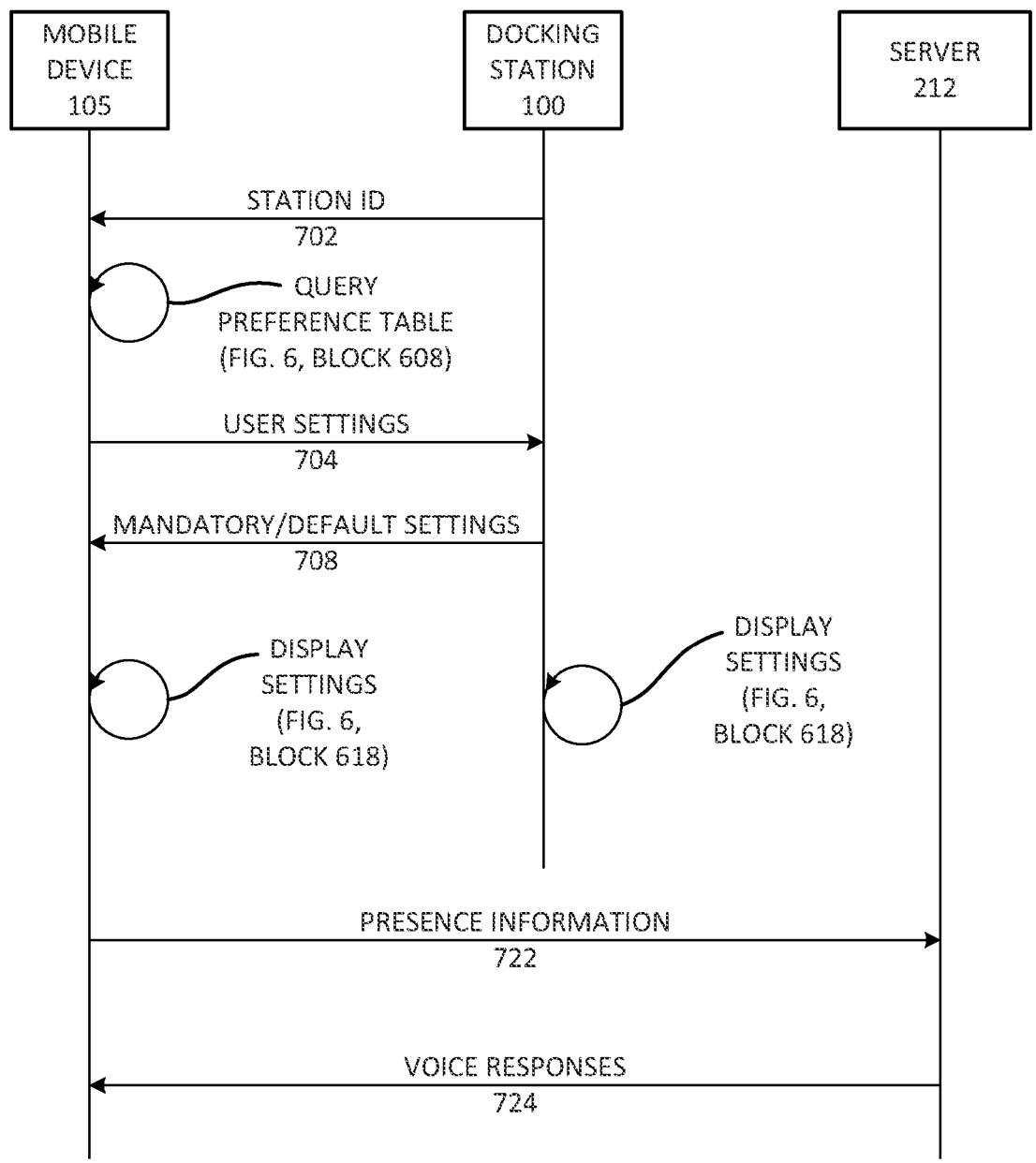
FIG. 7 is a signal diagram of exemplary messages sent between the devices of the network of FIG. 2 in one embodiment.

Mobile device 105 may recognize that it is inserted into docking station 100 and, in response, may launch user-interface logic 510 (e.g., an application in mobile device 105) (block 604). In one embodiment, docking station 100 identifies itself to mobile device 105 (block 606). As shown in FIG. 7, docking station 100 may send station ID message 702 to mobile device 105. Station ID message 702 may include docking station ID 548 stored in docking station 100. As discussed above, docking station ID 548 (e.g., included in station ID message 702) may include a serial number or MAC address associated with docking station 100. In one embodiment, mobile device 105 may query a database (e.g., in server 212 or in mobile device 105 itself, for example) to determine the location or the type of environment associated with docking station 100 (e.g., conference room, bedroom, office, cubicle). In another embodiment, station ID 548 (e.g., station ID message 702) may include a description of docking station 100, such as "Conference Room 8B" or simply "Conference Room."

Mobile device 105 may query preference table 502 (e.g., with station ID 548 received in station ID message 702) to determine the settings for docking station 100 (block 608). For example, mobile device 105 may query preference table 502 with "Conference Room 8B" to determine what settings apply to docking station 100. In the current example, rule 530-1 would apply.

The appropriate settings may be transferred from mobile device 105 to docking station 100 (block 610). As shown in FIG. 7, user-interface logic 510 in mobile device 105 sends user settings message 704 to docking station 100. In the current example, the information in settings field 526 of rule 530-1 is sent from mobile device 105 (e.g., in user settings message 704) to docking station 100 and received by docking station 100. User settings message 704 may specify items in field 526 of preference table 502, such as a ringtone, a ring volume, or a list of contacts. Docking station 100 may store the received settings from mobile device 105 as received settings 542. In one embodiment, the entire preference table 502 may be sent to docking station 100 (e.g., in user settings message 704) and docking station 100 may determine the relevant settings. In one embodiment, user settings message 704 may include multimedia, such as an audio file for a ringtone, images of contacts, icons, etc. In one embodiment, user settings message 704 may include links (e.g., a universal resource locator or URL) to media content.

Docking station 100 may change its settings according to received settings 542 (block 614). For example, as shown in FIG. 1A, display 106 shows information in English, consistent with rule 530-1 in preference table 502. As another example, if user settings message 704 specifies a ringtone, then docking station 100 would play that ringtone when an incoming call is received for mobile device 105. If user settings message 704 specifies a ring volume, then docking station 100 would play the ringtone at the ring volume when an incoming call is received for mobile device 105. Further, if user settings message 704 specifies a list of contacts, then docking station 100 may display that list of contacts on display 106 so that the user may call any of the contacts by selecting the corresponding button, for example.

Some of the settings, however, may not be specified in received settings 542. In this case, docking station 100 may use settings stored in default settings 544. Further, some of the settings specified in received settings 542 may conflict with mandatory settings 546 stored in docking station 100. In this case, docking station 100 may override received settings 542 with mandatory settings 546 (block 616). Further, docking station 100 may transmit mandatory settings 546 and/or default settings 544 to mobile device 105 in mandatory/default settings message 708.

Mobile device 105 may display the current settings (block 618). The current settings may be a function of the settings sent to docking station 100 (e.g., in user settings message 704 and stored as received settings 542) and those received from docking station 100 (e.g., in mandatory/default settings message 708 and stored as default settings 544 and mandatory settings 546). As shown in FIG. 1A, current settings are displayed on display 107 of mobile device 105 in docking station 100. Further, docking station 100 displays Samantha's work contacts in display 106 (according to settings in user settings message 704) with presence information for those contacts displayed in English (again, according to settings in user settings message 704).

In one embodiment, mobile device 105 may publish presence information to server 212 (block 620). As shown in FIG. 7, presence information message 722 may be sent from mobile device 105 to server 212. In this embodiment, presence information message 722 includes information that is indicative of the settings transmitted to docking station 100 in user settings message 704. In one embodiment, the docking of mobile device 105 with docking station 100 may change the presence information associated with the user of mobile device 105 (e.g., based on presence rules). Presence information message 722 may include station ID message 702 or information regarding docking station 100, such as "Conference Room 8B." In one embodiment, presence information message 722 may include the settings sent in user settings message 704. In this embodiment, server 212 may also interpret the settings information in presence information message 722 and behave accordingly (block 622). Alternatively, server 212 may query preference database 564 with the information in presence information message 722 and behave accordingly (block 622). That is, server 212 may provide an application to the user of mobile device 105 according to the appropriate settings at the time.

For example, voice response unit 570 may change the language used based on presence information message 722. In this embodiment, server 212 may query user preference database 564 with information received in presence information message 722 (e.g., "conference room 8B") to determine proper behavior. In the current example, voice response unit 570 may respond to the user in English when the user is at work (according to preference table 502 stored in preference database 564) and may respond to the user in Spanish when the user is at home (according to preference table 502 stored in preference table 564). Thus, should Samantha call server 212 for her voicemail while in conference room 8B, then voice response messages 716 will be in English (based on information in user settings message 704 and rule 530-1). Should Samantha call server 212 for her voicemail while at home, then voice response messages 716 will be in English (based on information in user settings message 704 and rule 530-5).

Mobile device 105 may be removed from docking station 100 (block 624) and the docking station settings may return to default settings (block 626). For example, as shown in FIG. 1B, when mobile device 105 is removed from docking station 100, display 106 goes blank.

As another example, if mobile device 105 is docked in docking station 202, which is in Samantha's home, then station ID message 702 may indicate so to mobile device 105 (e.g., "home"). Mobile device 105 may then send user settings message 704 to docking station 202 including the information stored in settings field 526 of rule 530-5. Presence information message 722 in this instance would include an indication of "at home." Docking station 202 and mobile device 105 would then behave accordingly. For example, the contacts listed on the display of docking station 202 would include personal favorites (SPEED DIAL=PERSONAL FAVORITES) and information would be displayed in Spanish (LANGUAGE=SPANISH).

In one embodiment, mobile device 105 may also synchronize contact and preference information stored in mobile device 105 with contact information stored in server 212 (e.g., before or after docking mobile device 105 with docking station 100). For example, sync logic 512 in mobile device 105 may synchronize contact list 506 with contact list 562.

As shown above, docking station 100 may complement the form factor of mobile phone 105. Docking station 100 may receive settings information from mobile device 105 and may behave accordingly. In one embodiment, different contacts may be associated with buttons 108, for example.

As described above, in one embodiment, mobile device 105 is physically docked in port 111 of docking station 100. In another embodiment, docking includes placing mobile device 105 near docking station 100 and mobile device 105 may communicate with docking station 100 wirelessly (e.g., wirelessly docking mobile device 105 with docking station 100 via Bluetooth, NFC, etc.). In this embodiment, mobile device 105 may still transmit information (e.g., settings information) to docking station 100. Further, mobile device 105 may receive information from docking station 100, such as an indication of a selection of a contact by a user.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A system comprising:
    a docking station including:
        a transmitter to send an identifier associated with the docking station to a mobile device proximate to the docking station;
        a receiver to receive settings from the mobile device, wherein the settings are based on the identifier associated with the docking station, and wherein the settings specify at least one of a ring volume, a ringtone, or a list of contacts;
        a processor to interpret the settings so that the docking station performs according to the settings; and
        a display to show the list of contacts, wherein the settings include the list of contacts, wherein each contact is associated with a sensor to receive an input from a user to select the corresponding contact, and
        wherein the transmitter is configured to send a selection of one of the contacts in the list of contacts, as input by the user via the corresponding sensor, to the mobile device to initiate a telephone call with a device associated with the selected contact.

2. The system of claim 1, further comprising:
    a network device, different from the docking station, including:
        a receiver to receive information from the mobile device indicative of the settings transmitted to the docking station; and
        a processor to provide an application service to a user of the mobile device based on the information indicative of the settings.

3. The system of claim 2, wherein the information indicative of the settings specifies a language, and wherein the processor provides the application service to the user of the mobile device in the specified language.

4. The system of claim 1, wherein the settings include the ringtone, the docking station further comprising a speaker to play the ringtone when the mobile device receives an incoming call.

5. The system of claim 4, wherein the settings include the ring volume, and wherein the processor instructs the speaker to play the ringtone at the ring volume when the mobile device receives the incoming call.

6. The system of claim 1,
    wherein the receiver of the docking station is configured to receive presence information associated with each contact in the list of contacts, and
    wherein the display of the docking station is configured to display the presence information associated with each contact in the list of contacts.

7. The system of claim 6, wherein the docking station further comprises:
    a plurality of indicator lights, wherein each contact in the list of contacts is associated with one of the indicator lights, and
    wherein the settings specify one or more colors for the indicator lights to indicate the presence information.

8. The system of claim 1, further comprising:
    the mobile device, wherein the mobile device includes:
        a transmitter to send the settings from the mobile device to the docking station;

a receiver to receive the docking station identifier from the docking station; and a processor to determine the settings from a plurality of settings, based on the docking station identifier, to transmit to the docking station.

9. The system of claim 1, wherein the docking station further comprises a docking port configured to physically receive a mobile device.

10. A method comprising:

transmitting an identifier associated with a docking station to a mobile device, wherein the mobile device is proximate to the docking station;

receiving settings from the mobile device, wherein the settings are based on the identifier associated with the docking station, wherein the settings specify at least one of a ring volume, a ringtone, or a list of contacts;

interpreting the settings to play the ringtone in the docking station when the mobile device receives an incoming call, to play one ringtone in the docking station at the ring volume when the mobile device receives an incoming call, or to display the list of contacts on a display of the docking station;

displaying the list of contacts on a display of the docking station, wherein the settings include the list of contacts, and wherein each displayed contact is associated with a sensor to receive an input from a user to select the corresponding contact;

receiving a selection of one of the contacts in the list from the user through one of the sensors; and transmitting the selection of the one of the contacts in the list of contacts, as input by the user, to the mobile device to initiate a telephone call with a device associated with the selected contact.

11. The method of claim 10, further comprising:

receiving information indicative of the settings in a network device other than the docking station; and providing an application to a user of the mobile device based on the settings.

12. The method of claim 10, wherein the settings include the ringtone, the method further comprising playing the ringtone on a speaker in the docking station when the mobile device receives the incoming call.

13. The method of claim 12, wherein the settings include the ring volume, the method further comprising playing the ringtone at the ring volume when the mobile device receives the incoming call.

14. The method of claim 10, the method further comprising:

receiving presence information associated with each contact in the list of contacts; and displaying the presence information associated with each contact.

15. The method of claim 14, wherein the settings specify one or more colors for indicator lights in the docking station to indicate the presence information, the method further comprising:

illuminating the indicator lights based on the settings specifying the one or more colors.

16. The method of claim 10, further comprising physically receiving the mobile device in a docking port of the docking station.

17. A mobile device comprising:

a receiver to receive a docking station identifier from a docking station, wherein the docking station is proximate to the mobile device;

a memory to store a plurality of settings, wherein one of the plurality of settings specifies a ringtone, a ring volume, or a list of contacts;

a processor to query the plurality of settings to select the one of the plurality of settings based on the docking station identifier; and a transmitter to transmit the selected one of the plurality of settings from the mobile device to the docking station, wherein one of the plurality of settings specifies the list of contacts and wherein the docking station is configured to display the list of contacts such that each contact is associated with a sensor in the docking station to receive an input from a user to select the corresponding contact, and wherein the receiver is configured to receive a selection of one of the contacts in the list of contacts, as input by the user via the corresponding sensor, from the docking station to initiate a telephone call with a device associated with the selected contact.

18. The mobile device of claim 17, wherein the transmitter is configured to send, to a network device not the docking station, information indicative of the settings transmitted to the docking station; and wherein the processor is configured to receive an application service from the network device based on the information indicative of the settings.

19. The mobile device of claim 18, wherein the information indicative of the settings indicates a language, and wherein the processor provides the application service to a user of the mobile device in the indicated language.

\* \* \* \* \*